United States Patent [19]

Fujioka et al.

[11] Patent Number: 6,080,827
[45] Date of Patent: *Jun. 27, 2000

[54] ETHYLENE POLYMER

[75] Inventors: Kiyotoshi Fujioka, Yokohama; Toshiyuki Tajiri, Yokkaichi; Eiji Isobe, Yokohama; Kazuhisa Tachi, Kawasaki; Toshihiko Sugano, Yokohama, all of Japan

[73] Assignee: Mitsubishi Chemical Corporation, Tokyo-To, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/882,749

[22] Filed: Jun. 26, 1997

[30] Foreign Application Priority Data

Jun. 26, 1996 [JP] Japan ................................ 8-165873

[51] Int. Cl.⁷ .................................................. C08F 110/02
[52] U.S. Cl. ........................... 526/352; 526/160; 526/943
[58] Field of Search .................................. 526/160, 352, 526/943

[56] References Cited

U.S. PATENT DOCUMENTS

| | | | |
|---|---|---|---|
| 4,264,472 | 4/1981 | Ikegami et al. | 252/429 |
| 5,547,722 | 8/1996 | Uehara et al. | 428/35.7 |
| 5,576,400 | 11/1996 | Suga et al. | 526/65 |

*Primary Examiner*—David W. Wu
*Assistant Examiner*—Ling-Siu Choi
*Attorney, Agent, or Firm*—Oblon, Spivak, McClelland, Maier & Neustadt, P.C.

[57] ABSTRACT

An ethylene polymer, which is an ethylene homopolymer or a copolymer of ethylene and an α-olefin having 3 to 20 carbon atoms, having the following properties:

(1) the melt index (MI) at a temperature of 190° C. under a load of 21.6 kg is in the range of 0.1 to 100 g/10 min;

(2) the density is in the range of 0.935 to 0.975 g/cm³; and (3) the characteristic value of biaxial extensional flow, λMAX (λMAX herein is an index of the extension ratio at which the nominal stress is maximum, provided that the extension ratio is in the range of 1 to 3, experimentally obtainable by a biaxial extensional flow test carried out at 190° C. at a constant strain rate dϵ/dt of 0.05 s⁻¹), is at least 1.6.

3 Claims, 1 Drawing Sheet

ETHYLENE POLYMER

BACKGROUND OF THE INVENTION

1. Field of the Invention

The present invention relates to a novel ethylene polymer. More particularly, the present invention relates to an ethylene polymer which shows excellent molding properties when processed by means of extrusion, vacuum, film or blow molding and which is excellent in mechanical properties such as impact resistance.

2. Background Art

In recent years, plastic pipes, films and blow-molded products have been extensively used in various industrial fields. In particular, polyethylene resins are now being widely used for the reasons that they are inexpensive, light in weight, excellent in molding properties and in chemical resistance, and reusable.

A typical process of blow molding consists of the following steps:

(1) a step of forming a tubular parison by extruding a melted resin from an extruder or accumulator through a circular die;

(2) a step of blowing up the parison in a metal mold by means of air pressure, thereby shaping the parison to the shape of the metal mold; and (3) a step of cooling the molded material, which is in close contact with the inner wall of the metal mold, for solidification.

Those resins which are subjected to such a molding process are required to have, as molding properties, drawdown resistance which is needed for forming parisons, and uniform extensibility which are needed in the step of blowing up the parisons. Further, with respect to physical properties, the resins are also required to be excellent in rigidity and impact resistance.

It has conventionally been considered in the field of blow molding that molding properties (drawdown resistance, uniform extensibility) and basic melt properties are in the following relationship. Namely, when a resin has, as basic melt properties, such properties that the stress in extension is more drastically increased when the resin is melt extended with high strain (strain hardening), the resin has more excellent molding properties. In order to impart such melt properties to polyethylene resins, there have been proposed (1) a method in which the molecular weight distribution is broadened by means of multistage polymerization using Ziegler catalysts (Japanese Patent Laid-Open Publications No. 53811/1990 and No. 132109/1990); and (2) a method in which a long branched-chain structure is introduced by adding a radical initiator and a crosslinking agent to the resins (Japanese Patent Publication No. 52654/1990). However, these methods still have the following problems; that is, in the case of the method (1), strain hardening is not easily caused, and a highly-extended part tends to become thin; and, when the method (2) is employed, the impact resistance of the resins is lowered. Further, even among those resins which tend to cause strain hardening, some resins are found to be poor in drawdown resistance and uniform extensibility. The relationship between basic melt properties and molding properties has thus been quite obscure.

SUMMARY OF THE INVENTION

An object of the present invention is to provide a novel ethylene polymer which is excellent in molding properties typified by uniform extensibility and drawdown resistance, and also in mechanical properties.

We made earnest studies in order to attain the above object, and, as a result, found that an ethylene polymer, which is either an ethylene homopolymer or a copolymer of ethylene and other α-olefin, having a melt index (MI), density (ρ) and characteristic value of biaxial extensional flow (λMAX) in specific ranges is excellent in both molding properties and mechanical properties. In particular, it was found that the correlation between uniform extensibility and basic melt properties can be explained, contrary to the conventional knowledge, more rationally by λMAX than by the apparent degree of strain hardening.

Thus, the present invention provides an ethylene polymer, which is an ethylene homopolymer or a copolymer of ethylene and an α-olefin having 3 to 20 carbon atoms, having the following properties:

(1) the melt index (MI) at a temperature of 190° C. under a load of 21.6 kg is in the range of 0.1 to 100 g/10 min;

(2) the density is in the range of 0.935 to 0.975 g/cm$^3$; and (3) the characteristic value of biaxial extensional flow, λMAX (λMAX herein is an index of the extension ratio at which the nominal stress is maximum, provided that the extension ratio λ is in the range of 1 to 3, experimentally obtainable by a biaxial extensional flow test carried out at 190° C. at a constant strain rate dε/dt of 0.05 s$^{-1}$), is at least 1.6.

The ethylene polymer of the present invention is excellent in molding properties such as drawdown resistance and uniform extensibility, and also in mechanical properties such as impact resistance, so that it can provide a blow-molded product which is thinner in thickness and lighter in weight as compared with the conventional products.

Moreover, the ethylene polymer of the present invention also shows excellent flow stability when it is melt-extruded, and is excellent in breaking strength and breaking extension at the time of cold extension. Therefore, the ethylene polymer according to the present invention can be suitably used also for other molding methods than blow molding.

DETAILED DESCRIPTION OF THE INVENTION

Figure 1:
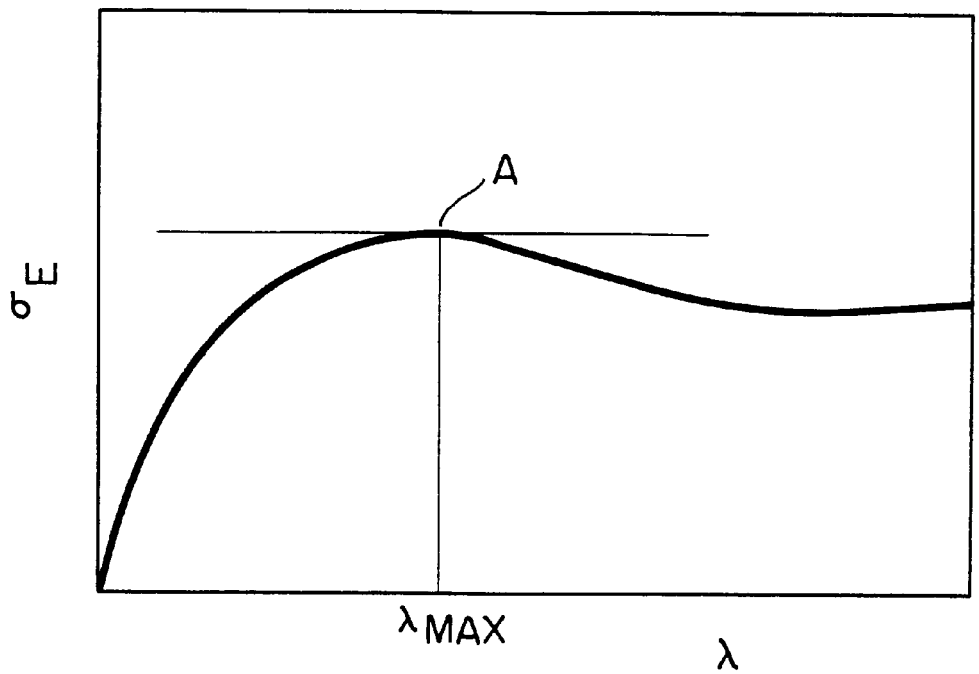
FIG. 1 is a graph showing the characteristic value of biaxial extensional flow, λMAX.

The ethylene polymer of the present invention is an ethylene homopolymer, or a random copolymer of ethylene and an α-olefin having 3 to 20 carbon atoms. The α-olefin content of the ethylene copolymer is preferably 10% by weight or less, more preferably 5% by weight or less. When the α-olefin content exceeds the above range, the rigidity of the ethylene copolymer is lowered.

As the α-olefin having 3 to 20 carbon atoms, propylene, butene-1, pentene-1, 3-methylbutene-1, hexene-1, 4-methylpentene-1, 3-methylpentene-1, octene-1, decene-1, tetradecene-1, hexadecene-1, octadecene-1, eicosene-1 or the like can be used. In addition, a vinyl compound such as vinylcyclohexane or styrene, or a derivative thereof can also be used. Further, a random terpolymer of ethylene, an α-olefin having 3 to 20 carbon atoms, and a small amount of an unconjugated polyene or of a cyclic olefin can also be used, as needed.

The melt index (MI) of the ethylene polymer of the present invention is in the range of 0.1 to 100 g/10 min, preferably in the range of 0.5 to 50 g/10 min. When the ethylene polymer has an MI lower than 0.1 g/10 min, a parison made from this ethylene polymer has a rough surface, or is ruptured in the blow-up step. On the other hand, when the ethylene polymer has an MI larger than 100 g/10 min, drawdown is remarkably caused. It is noted that the MI can be measured in accordance with ASTM D-1238-57T at a temperature of 190° C. under a load of 21.6 kg.

The density of this ethylene polymer is from 0.935 to 0.975 g/cm$^3$, preferably from 0.945 to 0.970 g/cm$^3$. When the ethylene polymer has a density lower than this range, it has impaired rigidity. It is noted that the density can be measured in accordance with JIS K6760.

The characteristic value of biaxial extensional flow, λMAX (λMAX herein is an index of the extension ratio at which the nominal stress is maximum, provided that the extension ratio λ is in the range of 1 to 3, experimentally obtainable by a biaxial extensional flow test carried out at a constant strain rate dϵ/dt of 0.05 s$^{-1}$), is at least 1.6, preferably more than 1.62, more preferably more than 1.65.

The biaxial extensional flow test herein means a test for determining flow properties based on the fact that uniaxial compressional deformation corresponds to uniform biaxial extensional deformation. Namely, it is a test method for evaluating the biaxial extensional flow properties by the value of stress measured in the direction of compression, utilizing the fact that, when a sample sandwiched between two plates is compressed, the sample material is extended in the radius direction perpendicular to the thickness of the sample with the decrease in the thickness of the sample. The principle of this measurement is known as the lubricating squeezing flow method [P. R. Soskey, H. H. Winter; *J. Rheol*, 29, 493 (1985), etc.].

The characteristic value of biaxial extensional flow of the ethylene polymer of the present invention can be determined by a constant area, constant strain rate test.

The relationship between the uniform biaxial extensional strain rate dϵ/dt in the radius direction and the thickness h of a sample can be shown by the following equation:

$$d\epsilon/dt = -(1/2h)(dh/dt)$$

wherein d/dt represents first order differentiation on a function of time.

When the nominal stress $\sigma_E$ is plotted against the extension ratio λ (the ratio of the initial diameter of a sample to the diameter of the same at a certain point of measurement) obtained by compressing the sample in the radius direction, the correlation shown by the graph of FIG. 1 can be obtained. λMAX can be known as the peak A of the curve of the graph.

It is noted that the extension ratio λ, and the nominal stress $\sigma_E$ can be known from the following equations:

$$\lambda = (h_0/h_1)^{1/2}$$

$$\sigma_E = F/A_0$$

wherein $h_0$ is the initial thickness of a sample, $h_1$ is the thickness of the sample when the measurement is carried out, F is a compression load, and $A_0$ is an initial cross-sectional area.

The test is carried out at a constant strain rate (dϵ/dt) of 0.05 s$^{-1}$.

Figure 2:
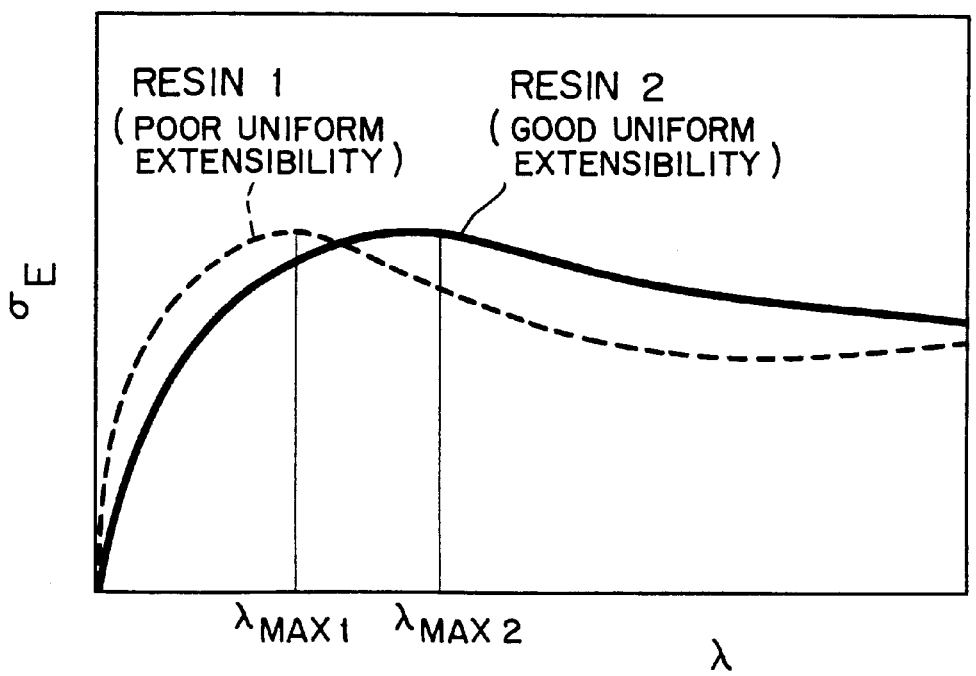
FIG. 2 is a graph showing the correlation between the λMAX and molding properties.

The λMAX is useful as an index of the flow properties of a resin. A resin having a large λMAX value, that is, a resin having properties similar to those of the resin 2, rather than to those of the resin 1, as shown in the graph of FIG. 2, maintains a higher tension even at a part with high extension ratio, under biaxial extensional flow caused in the blow-up step in a blow molding process. For this reason, when such a resin is molded by using a complicated metal mold, even those parts of the molded product which correspond to the corners or projecting parts of the metal mold, to which high strains are applied, are not thinned. The resin thus shows excellent molding properties.

The evaluation of the uniform extensibility has conventionally been discussed in relation to the strain hardening phenomenon which is observed under uniaxial extensional flow (Japanese Patent Laid-Open Publications No. 53811/1990 and No. 132109/1990). However, in a practical blow molding process, a question is not stress (tension/sectional area) but an increase of tension with time. Therefore, an evaluation method based on nominal stress (tension/initial sectional area) is more essential and practical.

Blow-molded products obtained by the use of the above-described resins are highly uniform in thickness, so that they are excellent in terms of economy and lightness in weight. In addition, these resins are also advantageous when the production thereof is taken into consideration; for instance, the time required for the cooling step which comes after the shaping step can be shortened. A resin having a λMAX of less than 1.60 is poor in molding properties, in particular, in uniform extensibility. Such a resin is therefore unfavorable.

The ethylene polymer of the present invention preferably has the following properties:

(1) The melt tension (MT) measured at 190° C. and the MI of the ethylene polymer can be shown by the following relational expression:

log MT>−0.31 log MI+1.64, preferably by the following relational expression:

log MT>−0.31 log MI+1.69.

When the ethylene polymer has an MT lower than the above range, drawdown is likely to be caused when a parison is formed, so that the ethylene polymer cannot often be successfully molded. Moreover, in the step of blowing up the parison, there are such possibilities that the parison becomes ununiform in wall thickness and that the parison is ruptured at the thinned part thereof.

(2) The Izod impact strength measured at −40° C. and the MI of the ethylene polymer can be shown by the following relational expression:

log Izod>−0.39 log MI+2.02, preferably by the following relational expression:

log Izod>−0.39 log MI+2.11, more preferably by the following relational expression:

log Izod>−0.39 log MI+2.18.

When the Izod value of the ethylene polymer is made lower than the above range, the impact resistance of the polymer is lowered. There is no particular limitation on the process for producing the ethylene polymer of the present invention. However, the ethylene polymer can be suitably produced by the use of, for instance, a catalyst composed of at least two components shown below.

Component [A]: a compound of a transition metal belonging to groups 4B to 6B of the periodic table, having at least one conjugated 5-membered cyclic ligand; and Component [B]: at least one compound having a water content of not higher than 3% by weight, selected from the group consisting of (1) ion-exchangeable layered compounds other than silicates and (2) inorganic silicates, wherein the compound has been brought into contact with a salt soluble in water or in an acidic aqueous solution, consisting of a cation containing at least one atom selected from the group consisting of transition metal atoms belonging to groups 4B to 6B of the periodic table, and at least one anion selected from the group consisting of halogen atoms, inorganic acid anions and organic acid anions.

In addition, an organoaluminum compound [C] can also be used, when necessary.

Explanations for the above three components [A], [B] and [C] will be given below.

A compound represented by the following general formula [1], [2], [3] or [4] is usually used as the component [A]:

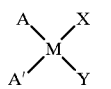

[1]

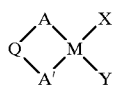

[2]

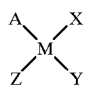

[3]

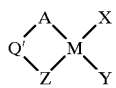

[4]

wherein A and A', which may be the same or different in one compound, each represent a conjugated 5-membered cyclic ligand; Q represents a binding group which crosslinks the two conjugated 5-membered cyclic ligands at any position thereof; Z represents a ligand containing nitrogen, oxygen, silicon, phosphorus or sulfur atom which is bonded to M, hydrogen atom, a halogen atom or a hydrocarbon group; Q' represents a binding group which crosslinks the conjugated 5-membered cyclic ligand and Z at any position of the ligand; M represents a metal atom selected from groups 4B to 6B of the periodic table; and X and Y represent hydrogen atom, a halogen atom, a hydrocarbon group, an alkoxy group, amino group, a phosphorus-containing hydrocarbon group or a silicon-containing hydrocarbon group which is bonded to M.

A and A' each are a conjugated 5-membered cyclic ligand, and, as mentioned above, they may be the same or different in one compound. A typical example of the conjugated 5-membered cyclic ligand (A or A') is a conjugated 5-membered carbon cyclic ligand, that is, cyclopentadienyl group. This cyclopentadienyl group may be either a group sharing five hydrogen atoms, that is, $C_5H_5$, or a derivative thereof, that is, some of the five hydrogen atoms are substituted with substituents. A specific example of such a substituent is a hydrocarbon group having 1 to 20 carbon atoms, preferably 1 to 12 carbon atoms. This hydrocarbon group can be a monovalent group bonded to the cyclopentadienyl group. Alternatively, when a plurality of the hydrocarbon groups are present, two of them may be bonded to each other at one respective ends thereof (ω-end) to form a ring along with a part of the cyclopentadienyl group. A typical example of the latter case is a group in which two substituents are bonded to each other at the respective ω-ends thereof to form a condensed 6-membered ring along with two adjacent carbon atoms on the cyclopentadienyl group, that is, indenyl or fluorenyl group.

Therefore, it can be said that typical examples of the conjugated 5-membered cyclic ligand (A or A') are substituted or unsubstituted cyclopentadienyl, indenyl and fluorenyl groups.

Examples of the substituent which may be present on the cyclopentadienyl group include, in addition to the above-described hydrocarbon groups having 1 to 20 carbon atoms, preferably 1 to 12 carbon atoms, halogen groups (e.g., fluorine, chlorine, bromine), alkoxy groups having, for example, 1 to 12 carbon atoms, silicon-containing hydrocarbon groups, for example, hydrocarbon groups containing silicon atom in the form of $-Si(R^1)(R^2)(R^3)$, having approximately 1 to 24 carbon atoms, phosphorus-containing hydrocarbon groups, for example, hydrocarbon groups containing phosphorus atom in the form of $-P(R^1)(R^2)$, having approximately 1 to 18 carbon atoms, nitrogen-containing hydrocarbon groups, for example, hydrocarbon groups containing nitrogen atom in the form of $-N(R^1)(R^2)$, having approximately 1 to 18 carbon atoms, and boron-containing hydrocarbon groups, for example, hydrocarbon groups containing boron atom in the form of $-B(R^1)(R^2)$, having approximately 1 to 18 carbon atoms. When two or more of these substituents are present on the cyclopentadienyl group, they may be either the same or different.

Q represents a binding group which crosslinks the two conjugated 5-membered cyclic ligands at any position thereof; and Q' represents a binding group which crosslinks the conjugated 5-membered cyclic ligand and group Z at any position of the ligand.

Specific examples of Q and Q' are as follows:
(a) alkylene groups having 1 to 20 carbon atoms such as methylene, ethylene, isopropylene, phenylmethylmethylene, diphenylmethylene and cyclohexylene groups;
(b) silylene groups such as silylene, dimethylsilylene, phenylmethylsilylene, diphenylsilylene, disilylene and tetramethyldisilylene groups; and
(c) hydrocarbon groups containing germanium, phosphorus, nitrogen, boron or aluminum; specifically, $(CH_3)_2Ge$, $(C_6H_5)_2Ge$, $(CH_3)P$, $(C_6H_5)P$, $(C_4H_3)N$, $(C_6H_5)N$, $(CH_3)B$, $(C_4H_3)B$, $(C_6H_5)B$, $(C_6H_5)Al$ and $(CH_3O)Al$ groups. Of these, alkylene groups and silylene groups are preferred.

M is a metal atom selected from groups 4B to 6B of the periodic table, preferably a metal atom belonging to group 4B of the periodic table, specifically, titanium, zirconium or hafnium. Zirconium is particularly preferred.

Z is a ligand containing nitrogen, oxygen, silicon, phosphorus or sulfur atom which is bonded to M, hydrogen atom, a halogen atom, or a hydrocarbon group. Specific examples of preferred Z include oxygen (—O—), sulfur (—S—), alkoxy groups having 1 to 20 carbon atoms, preferably 1 to 10 carbon atoms, thioalkoxy groups having 1 to 20 carbon atoms, preferably 1 to 12 carbon atoms, silicon-containing hydrocarbon groups having 1 to 40 carbon atoms, preferably 1 to 18 carbon atoms, nitrogen-containing hydrocarbon groups having 1 to 40 carbon atoms, preferably 1 to 18 carbon atoms, phosphorus-containing hydrocarbon groups having 1 to 40 carbon atoms, preferably 1 to 18 carbon atoms, hydrogen atom, chlorine, bromine, and hydrocarbon groups having 1 to 20 carbon atoms.

X and Y respectively represent hydrogen, a halogen group, a hydrocarbon group having 1 to 20 carbon atoms, preferably 1 to 10 carbon atoms, an alkoxy group having 1 to 20 carbon atoms, preferably 1 to 10 carbon atoms, amino group, a phosphorus-containing hydrocarbon group having 1 to 20 carbon atoms, preferably 1 to 12 carbon atoms (specifically, for example, diphenylphosphine group), or a silicon-containing hydrocarbon group having 1 to 20 carbon atoms, preferably 1 to 12 carbon atoms (specifically, for example, trimethylsilyl or bis (trimethylsilyl)methyl group). X and Y may be either the same or different. Of these, a halogen group, a hydrocarbon group (especially, one having 1 to 8 carbon atoms) and amino group are preferred.

Therefore, among the compounds represented by the general formula [1], [2], [3] or [4], preferable as the component [A], those ones which have the following respective substituents are particularly preferred.

A, A'=cyclopentadienyl, n-butyl-cyclopentadienyl, indenyl, 2-methyl-indenyl, 2-methyl-4-phenylindenyl, tetrahydroindenyl, 2-methyl-tetrahydroindenyl, 2-methylbenzo-indenyl;

Q, Q'=ethylene, dimethylsilylene, isopropylidene;

Z=t-butylamide, phenylamide, cyclohexylamide;

M=transition metals belonging to group 4B of the periodic table; and

X, Y=chlorine, methyl, diethylamino.

A mixture of two or more compounds selected from one group of the compounds represented by one of the general formulas [1], [2], [3] and [4], and/or from two or more different groups of the compounds can be used as the component [A].

Specific examples of the transition metal compound in which M is zirconium are as follows.

(a) Compounds represented by the general formula [1], that is, transition metal compounds which have two conjugated 5-membered cyclic ligands and no binding group Q; for instance,
  (1) bis(cyclopentadienyl)zirconium dichloride,
  (2) bis(methylcyclopentadienyl)zirconium dichloride,
  (3) bis(dimethylcyclopentadienyl)zirconium dichloride,
  (4) bis(trimethylcyclopentadienyl)zirconium dichloride,
  (5) bis(tetramethylcyclopentadienyl)zirconium dichloride, and
  (6) bis(pentamethylcyclopentadienyl)zirconium dichloride, etc.

(b) Compounds represented by the general formula [2];
  (b-1) examples of the compounds in which the binding group Q is an alkylene group include the following ones:
    (1) methylene-bis(indenyl)zirconium dichloride,
    (2) ethylene-bis(indenyl)zirconium dichloride,
    (3) ethylene-bis(indenyl)zirconium monochloride monohydride,
    (4) ethylene-bis(indenyl)methylzirconium monochloride,
    (5) ethylene-bis(indenyl)zirconium monomethoxide monochloride,
    (6) ethylene-bis(indenyl)zirconium diethoxide,
    (7) ethylene-bis(indenyl)zirconium dimethyl, etc.
  (b-2) examples of the compounds in which the binding group Q is a silylene group include the following ones:
    (1) dimethylsilylene-bis(indenyl)zirconium dichloride,
    (2) dimethylsilylene-bis(4,5,6,7-tetrahydroindenyl) zirconium dichloride,
    (3) dimethylsilylene-bis(2-methylindenyl)zirconium dichloride,
    (4) dimethylsilylene-bis(2,4-dimethylindenyl) zirconium dichloride,
    (5) dimethylsilylene-bis(2-methyl-4,5,6,7-tetrahydroin-denyl) zirconium dichloride,
    (6) dimethylsilylene-bis(2,4-dimethylcyclopentadienyl) (3',5'-dimethylcyclopentadienyl)zirconium dichloride,
    (7) dimethylsilylene-bis(2-methyl-4,5-benzoindenyl) zirconium dichloride, etc.
  (b-3) examples of the compounds in which the binding group Q is a hydrocarbon group containing germanium, phosphorus, nitrogen, boron or aluminum include the following ones:
    (1) dimethylgermanium-bis(indenyl)zirconium dichloride,
    (2) dimethylgermanium(cyclopentadienyl) (fluorenyl) zirconium dichloride,
    (3) methylaluminum-bis(indenyl)zirconium dichloride,
    (4) phenylaluminum-bis(indenyl)zirconium dichloride,
    (5) phenylphosphino-bis(indenyl)zirconium dichloride,
    (6) ethylborano-bis(indenyl)zirconium dichloride,
    (7) phenylamino-bis(indenyl)zirconium dichloride,
    (8) phenylamino(cyclopentadienyl)(fluorenyl) zirconium dichloride, etc.

(c) Compounds represented by the general formula [3], that is, transition metal compounds which have one conjugated 5-membered cyclic ligand and no binding group Q'; for instance,
  (1) pentamethylcyclopentadienyl-bis(phenyl) aminozirconium dichloride,
  (2) indenyl-bis(phenyl)amidozirconium dichloride,
  (3) pentamethylcyclopentadienyl-bis(trimethylsilyl) aminozirconium dichloride,
  (4) pentamethylcyclopentadienylphenoxyzirconium dichloride,
  (5) cyclopentadienylzirconium trichloride,
  (6) pentamethylcyclopentadienylzirconium trichloride,
  (7) cyclopentadienylzirconium benzyldichloride,
  (8) cyclopentadienylzirconium dichloride hydride,
  (9) cyclopentadienylzirconium dichloride triethoxide, etc.

(d) Compounds represented by the general formula [4], that is, transition metal compounds having one conjugated 5-membered cyclic ligand crosslinked to Z through the binding group Q'; for instance,
  (1) dimethylsilylene(tetramethylcyclopentadienyl) phenylamidozirconium dichloride,
  (2) dimethylsilylene(tetramethylcyclopentadienyl) tert-butylamidozirconium dichloride,
  (3) dimethylsilylene(indenyl) cyclohexylamidozirconium dichloride,
  (4) dimethylsilylene(tetrahydroindenyl) decylamidozirconium dichloride,
  (5) dimethylsilylene(tetrahydroindenyl)((trimethylsilyl)amino)zirconium dichloride,
  (6) dimethylgerman(tetramethylcyclopentadienyl) (phenyl) aminozirconium dichloride, etc.

(e) Those compounds which can be obtained by replacing the chlorine in the above-enumerated compounds (a) to (d) with bromine, iodine, hydride, or methyl or phenyl group can also be used.

Moreover, those compounds which can be obtained by replacing zirconium, the central metal, in the above zirconium compounds (a) to (e), which are enumerated as examples of the component [A], with titanium, hafnium, niobium, molybdenum or tungsten can also be used.

Of these compounds, zirconium compounds, hafnium compounds and titanium compounds are preferred, and zirconium compounds are more preferred.

As the component [B], a compound which is selected from (1) ion-exchangeable layered compounds other than silicates, and (2) inorganic silicates and which has been treated with a specific salt can be used. Some compounds may be classified into both of the group (1) ion-exchangeable layered compounds other than silicates, and the group (2) inorganic silicates. However, the compounds for use as the component [B] in the present invention should be classified into at least one of the groups (1) and (2).

The ion-exchangeable layered compounds other than silicates, before subjected to a salt treatment have such a crystalline structure that layers formed by ionic bond or the like are integrated in parallel with weak bonding force and that ions contained therein are exchangeable. Almost all clays are ion-exchangeable layered compounds of this type. In general, clays contain clay minerals as the main components thereof. These clays, clay minerals and ion-exchangeable layered compounds may be not only naturally-obtainable ones but also synthesized ones.

Specific examples of the clays and clay minerals include those of the allophane group such as allophane, those of the kaolin group such as dickite, nacrite, kaolinite and anorthite, those of the halloysite group such as metahalloysite and halloysite, those of the serpentine group such as crylsotile, lizardite and antigorite, those of the smectite group such as montmorillonite, sauconite, beidellite, nontronite, saponite and hectorite, vermiculite minerals such as vermiculite, mica minerals such as illite, sericite and glauconite, attapulgite, sepiolite, palygorskite, bentonite, ball clay, china clay, hisingerite, pyrophyllite and chlorite. A mixed layer of these clays or clay minerals is also acceptable.

Examples of the ion-exchangeable layered compound include ionic crystalline compounds having layered crystalline structures such as hexagonal-closest-packing-type, antimony-type, $CdCl_2$-type, and $CdI_2$-type structures. Specific examples of the ion-exchangeable layered compound include crystalline acidic salts of a polyvalent metal such as $\alpha$-$Zr(HAsO_4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HAsO_4)_2 \cdot H_2O$, $\alpha$-$Sn(HPO_4)_2 \cdot H_2O$, $\gamma$-$Zr(HPO_4)_2$, $\gamma$-$Ti(HPO_4)_2$ and $\gamma$-$Ti(NH_4PO_4)_2 \cdot H_2O$. It is possible to use these compounds as they are without subjecting them to any particular treatment. Alternatively, they can be used after subjected to ball-milling, screening, or an acid treatment in which the compounds are brought into contact with an inorganic acid such as hydrochloric, sulfuric or phosphoric acid, or with an organic acid such as formic, acetic or benzoic acid. Moreover, these compounds can be used either singly or in combination of two or more.

Zeolite and diatomaceous earth can be mentioned as the inorganic silicates.

The salt for use in the present invention is a compound soluble in water or in an aqueous acidic solution, consisting of a cation containing at least one atom selected from the group consisting of the transition metal atoms belonging to groups 4B to 6B of the periodic table, and at least one anion selected from the group consisting of halogen atoms, inorganic acid anions and organic acid anions.

Specific examples of such a salt include $Ti(OOCCH_3)_4$, $Ti(CO_3)_2$, $Ti(NO_3)_4$, $Ti(SO_4)_2$, $TiF_4$, $TiCl_4$, $TiBr_4$, $TiI_4$, $Zr(OOCCH_3)_4$, $Zr(CH_3COCHCOCH_3)_4$, $Zr(CO_3)_2$, $Zr(NO_3)_4$, $Zr(SO_4)_2$, $ZrF_4$, $ZrCl_4$, $ZrBr_4$, $ZrI_4$, $ZrOCl_2$, $ZrO(NO_3)_2$, $ZrO(ClO_4)_2$, $ZrO(SO_4)$, $Hf(OOCCH_3)_4$, $Hf(CO_3)_2$, $Hf(NO_3)_4$, $Hf(SO_4)_2$, $HfF_4$, $HfCl_4$, $HfBr_4$, $HfI_4$, $HfOCl_2$, $V(CH_3COCHCOCH_3)_3$, $VOSO_4$, $VOCl_3$, $VCl_3$, $VCl_4$, $VBr_3$, $Nb(CH_3COCHCOCH_3)_5$, $Nb_2(CO_3)_5$, $Nb(NO_3)_5$, $Nb_2(SO_4)_5$, $NbF_5$, $NbCl_5$, $NbBr_5$, $NbI_5$, $Ta(OOCH_3)_5$, $Ta_2(CO_3)_5$, $Ta(NO_3)_5$, $Ta_2(SO_4)_5$, $TaF_5$, $TaCl_5$, $TaBr_5$, $TaI_5$, $Cr(CH_3COCHCOCH_3)_3$, $Cr(OOCCH_3)_3$, $Cr(OOCH)_2OH$, $Cr(NO_3)_3$, $Cr(ClO_4)_3$, $CrPO_4$, $CR_2(SO_4)_3$, $CrO_2Cl_2$, $CfF_3$, $CrCl_3$, $CrBr_3$, $CrI_3$, $MoOCl_4$, $MoCl_3$, $MoCl_4$, $MoCl_5$, $MoF_6$, $MoI_2$, $WCl_4$, $WCl_6$, $WF_6$ and $WBr_5$.

The above-enumerated salts can be used in combination of two or more.

An acid treatment may be carried out before the ion-exchangeable layered compound or inorganic silicate is brought into contact with the salt (the contact with the salt may be referred to as a salt treatment). By this acid treatment, not only impurities on the surface of the compound treated can be removed, but also a part of or all of the cations such as Al, Fe and Mg contained in the crystalline structure are dissolved and run out.

The acid for use in the acid treatment can be selected from the previously-mentioned inorganic acids and organic acids, preferably from hydrochloric, sulfuric, nitric, acetic and oxalic acids. Two or more of these acids can be used at the same time.

There is no particular limitation on the conditions under which the ion-exchangeable layered compound or inorganic silicate is brought into contact with the salt or acid. In general, however, it is preferable to carry out the salt or acid treatment under such conditions that at least a part of the components of at least one compound selected from the group consisting of the ion-exchangeable layered compounds and the inorganic silicates is dissolved and runs out, by properly selecting the concentration of the salt or acid in a solution such as an aqueous solution from 0.1 to 30% by weight, the treatment temperature from the range between room temperature and the boiling point of a solvent used, and the treatment time from 5 minutes to 24 hours. Further, it is preferable to use the salt or acid in the form of an aqueous solution. In the present invention, the shape of the ion-exchangeable layered compound or inorganic silicate may be controlled by means of grinding or granulation before, during or after the above-described salt treatment. Moreover, other chemical treatments such as a treatment with an alkali or organic material may be carried out in addition to the salt treatment. Among the solid products thus obtained, preferable ones are those in which the volume of pores having radii of 20 Å or more is 0.1 cc/g or more, particularly from 0.3 to 5 cc/g when determined by the mercury injection method.

At least one compound selected from the group consisting of the ion-exchangeable layered compounds other than silicates, and the inorganic silicates generally contains adsorbed water, and interlaminar water. In the present invention, the component [B] is prepared by removing the adsorbed water and interlaminar water.

The term "adsorbed water" as used herein means water adsorbed by the surface or crystal fracture of the ion-exchangeable layered compound or silicate particles; and the term "interlaminar water" as used herein means water existing between crystalline layers. In the present invention, the ion-exchangeable layered compound or inorganic silicate from which the adsorbed water and/or interlaminar water has been removed by a heat treatment is used as the component [B]. There is no particular limitation on the method of the heat treatment for removing the adsorbed water and interlaminar water. It is however possible to employ such a means as thermal dehydration, thermal dehydration under a stream of gas, thermal dehydration under reduced pressure, or azeotropic dehydration with an organic solvent.

Examples of the organoaluminum compound which can be used, when necessary, as the component [C] include compounds represented by the following general formula:

$$AlR_aP_{3-a}$$

wherein R represents a hydrocarbon group having 1 to 20 carbon atoms, P represents hydrogen, a halogen atom or an alkoxy group, and a is a number larger than 0 but not larger than 3 ($0 < a \leq 3$); specifically, trialkyl aluminums such as trimethyl aluminum, triethyl aluminum, tripropyl aluminum and triisobutyl aluminum, and halogen- or alkoxy-containing alkyl aluminums such as diethyl aluminum monochloride and diethyl aluminum monomethoxide. In addition, aluminoxanes such as methyl aluminoxane can also be used as the component [C]. Of these organoaluminum compounds, trialkyl aluminums are particularly preferred.

The components [A] and [B] can be brought into contact with each other before they are introduced to a reactor. Alternatively, the contact between these two components can be made in a reactor. The ratio between the components [A] and [B] is such that the component [A] is from 0.0001 to 10 mmol, preferably from 0.001 to 5 mmol for 1 g of the component [B].

The organoaluminum compound can be introduced to a reactor when polymerization is carried out. It is also possible and preferable to bring the organoaluminum compound into contact with the component [B] in advance before these components are introduced to a reactor. The components [A], [B] and [C] can be brought into contact in any order.

When or after these components are brought into contact, it is also possible to allow a polymer such as polyethylene or polypropylene, or a solid inorganic oxide such as silica or alumina to coexist with the components, or to bring such a polymer or solid inorganic oxide into contact with the components.

The contact can be made in an inert gas such as nitrogen, or in an inert hydrocarbon solvent such as pentane, hexane, heptane, toluene or xylene. The contact temperature is between –20° C. and the boiling point of a solvent used; it is particularly preferable to make the contact between room temperature and the boiling point of a solvent used.

The amount of the organoaluminum compound to be used is from 0.001 to 10,000 mmol, preferably from 0.01 to 100 mmol for 1 g of the dried component [B]. In the case where the organoaluminum compound is brought into contact with the component [B] in advance, the resultant can be used as it is without washing it after the contact, or it can be used after washed.

It is also possible to use, as the catalyst, an olefin such as ethylene, propylene, 1-butene, 1-hexene, 1-octene, 4-methyl-1-pentene, 3-methyl-1-butene, a vinylcycloalkane or styrene which is prepolymerized and, if necessary, washed before polymerization is carried out.

It is preferable to carry out the above prepolymerization in an inert solvent under moderate conditions so that a polymer will be produced in an amount of 0.01 to 1,000 g, preferably 0.1 to 100 g per 1 g of the component [B].

The polymerization of ethylene, or of ethylene and an α-olefin having 3 to 20 carbon atoms is carried out in the presence of the catalyst. Examples of the α-olefin include propylene, 1-butene, 1-hexene, 1-octene, 4-methyl-1-pentene, 3-methyl-1-butene, vinylcycloalkanes and styrene, and derivatives thereof.

The polymerization reaction is carried out in the presence or absence of an inert hydrocarbon such as butane, pentane, hexane, heptane, toluene or cyclohexane, or of a solvent such as a liquefied α-olefin. The polymerization temperature is from –50 to 250° C. There is no particular limitation on the polymerization pressure. However, a preferable range of the polymerization pressure is between normal pressures and approximately 2,000 kg f/cm$^2$.

Further, hydrogen or the like may be allowed to exist in the polymerization system as a molecular weight modifier. The polymerization can also be carried out by a multi-step process by changing the polymerization temperature, the concentration of the molecular weight modifier, or the like.

The ethylene polymer of the present invention is excellent in molding properties such as drawdown resistance and uniform extensibility, and can also reveal excellent mechanical properties such as impact resistance.

Known additives such as fillers, pigments, weathering agents, heat stabilizers, flame retarders, plasticizers, antistatic agents, releasing agents, foaming agents, nucleating agents and lubricants may be added to the ethylene polymer of the present invention when it is molded.

It is also possible to obtain a multi-layered product by the use of the ethylene polymer of the present invention along with a resin having barrier properties, an adhesive resin or the like.

The present invention will now be explained more specifically by referring to the following examples. However, the present invention is not limited by these examples as long as it is within the gist thereof.

In the following examples, various physical properties of the ethylene polymers obtained were evaluated in accordance with the following methods.

(1) Melt Index (MI)

The melt index was measured in accordance with ASTM-D-1238-57T at a temperature of 190° C. under a load of 21.6 kg.

(2) Density (ρ)

The density was measured in accordance with JIS K6760.

13

(3) Characteristic Value of Biaxial Extensional Flow (λMAX)

The λMAX was determined by the use of a "MARS III" manufactured by Polymics Corp. This apparatus is a so-called constant-area-squeezing-type biaxial extension viscometer, and, when the measurement was carried out, a silicone oil ("KF96H" manufactured by Shin-Etsu Silicone Co., Ltd., having a kinematic viscosity of $1 \times 10_6$ cSt) was applied as a lubricant between the sample and a jig. The measurement was carried out at a temperature of 190° C., and at a constant strain rate of $d\epsilon/dt=0.05$ s$^{-1}$. The jig used was one for measuring a biaxial extension viscosity, having a diameter of 25 mm. The nominal stress $\sigma_E$ (tension/initial sectional area) measured was plotted against the extension ratio $\lambda$, and the value $\lambda$ at which $\sigma_E$ is maximum was taken as λMAX, provided that $\lambda$ is in the range of 1 to 3. Cylindrical pressed specimens having a diameter of 25 mm and a thickness of 12 mm, obtained from pellets were used for the measurement.

(4) Melt Tension (MT)

The melt tension was measured by using an automatic melt tension meter manufactured by Intesco Corp. under the following conditions: the nozzle diameter was 2.095 mm; the nozzle length was 8 mm; the entrance angle was 90°; the temperature was 190° C.; the extruder speed was 0.716 cc/min; the take-off speed was 2 m/min; and the air gap was 40 cm. It is noted that the ethylene polymer to which 0.1% by weight of 2,6-di-tert-butyl p-cresol had been added in advance was used for the measurement of the MI or MT.

(5) Izod Impact Strength

The Izod impact strength was measured in accordance with JIS K7110 at a temperature of −40° C. A pressed specimen having a width of 12.7 mm, a thickness of 3.2 mm and a length of 63.5 mm, provided with, at the center thereof, a notch having a depth of 2.54 mm and an angle of 45° was used for the measurement.

(6) Molding Properties

The polymer obtained was press-molded into a sheet having a thickness of 1.0 mm, and heated to 230° C. This sheet was then vacuum-molded into a rectangular parallel-epiped having dimensions of 125 mm×98 mm×40 mm (height). The uniformity of the section thickness of this molded product was observed, and evaluated according to the following criteria.

◯: The molded product is uniform in section thickness; extremely useful.

Δ: The molded product is slightly deficient in section thickness at the bottom thereof.

X: The molded product is deficient in section thickness at the bottom thereof; unsuitable for practical use.

(7) Molecular Weight

The weight-average molecular weight and the molecular weight distribution were measured by GPC (gas permeation chromatography), using "150 CV" manufactured by Waters Co., Ltd. The measurement was conducted at 150° C. using 1,2,4-trichlorobenzene as a solvent.

In the following examples, the synthesis of the catalysts and the polymerization were all conducted under purified-nitrogen atmosphere. Solvents dehydrated by MS-4A and deaerated by the bubbling of purified nitrogen were used.

14

EXAMPLE 1

(1) Chemical Treatment and Granulation of Clay Mineral 8 kg of commercially available montmorillonite was ground by a vibrating ball mill, and then dispersed in 50 liters of desalted water in which 10 kg of magnesium chloride had been dissolved. The mixture was stirred at 80° C. for 1 hour. The solid matter obtained was washed, and then dispersed in 56 liters of an 8.2% aqueous hydrochloric acid solution. The mixture was stirred at 90° C. for 2 hours, and washed with desalted water. The solid content of the aqueous slurry containing 4.6 kg of the montmorillonite thus treated with hydrochloric acid was adjusted to 15.2%, and the resultant was spray-granulated by a spray drier. The particles obtained by this granulation were found to be spherical. 20 g of the granulated hydrochloric-acid-treated montmorillonite was placed in a 1 liter flask, and dispersed in 400 ml of desalted water in which 48 g of $Cr(NO_3)_3 \cdot 9H_2O$ had been dissolved, and the mixture was stirred at 90° C. for 3 hours. After this treatment, the solid matter was washed with desalted water, and then dried to obtain chemically-treated montmorillonite.

(2) Thermal Dehydration of Clay Mineral 10.0 g of the chemically-treated montmorillonite obtained in the above (1) was placed in a 200 ml flask, and thermally dehydrated at 200° C. for 2 hours under a vacuum of 0.1 mmHg, thereby obtaining the catalyst component [B]. The weight loss caused by this dehydration treatment was found to be 1.3 g.

(3) Synthesis of Catalyst 3.0 g of the chemically-treated montmorillonite dehydrated in the above (2) was placed in a 100 ml flask, and dispersed in 20 ml of toluene to obtain a slurry. Subsequently, 1.3 ml of triethylaluminum was added to this slurry at room temperature with stirring. After the contact between the slurry and the triethylaluminum was made at room temperature for 1 hour, the supernatant liquid was removed, and the solid matter was washed with toluene. To this solid matter was added toluene to obtain a slurry. 12.0 ml of a toluene solution of bis(cyclopentadienyl) zirconium dichloride (20.0 micromol/ml) was added as the catalyst component [A] to the slurry, and the mixture was stirred at room temperature for 1 hour to obtain a catalyst.

(4) Production of Ethylene Polymer

In a 2-liter induction stirring autoclave thoroughly replaced with purified nitrogen, 1 liter of n-hexane, 0.15 mmol of triethyl aluminum serving as the catalyst component [C], and 100.0 mg of the catalyst obtained in the above (3) were placed. After the temperature of the mixture was raised to 90° C., polymerization was carried out for 1 hour with stirring while maintaining the total pressure at 22.0 kgf/cm$^2$ by introducing ethylene to the autoclave. The polymerization was terminated by adding 10 ml of ethanol. The amount of the ethylene polymer obtained was 280 g. The MI and density of this polymer were found to be 0.55 g/10 min and 0.946 g/cm$^3$, respectively. The λMAX and MT of the polymer were as high as 1.69 and 65.1 g, respectively. The Izod impact strength of the polymer was unmeasurable because the specimen was not broken at all (n.b.) in the measurement. Thus, it is clear that this polymer is excellent in both molding properties and mechanical properties.

The results are shown in Table 1.

EXAMPLE 2

(1) Production of Ethylene Polymer

The procedure of Example 1 (4) was repeated except that the catalyst obtained in Example 1 (3) was used in an amount of 120 mg and that hydrogen was introduced to the autoclave so that the gas composition [hydrogen/ethylene] inside the autoclave would be 0.034 mol %, thereby polymerizing ethylene. The amount of the ethylene polymer obtained was 310 g. The MI and density of this polymer were found to be 4.79 g/10 min and 0.954 g/cm$^3$, respectively. The λMAX and MT of the polymer were as high as 1.90 and 33.5 g, respectively. The Izod impact strength of the polymer was as extremely high as 93 kgcm/cm. Thus, it is clear that this polymer is excellent in both molding properties and mechanical properties. The results are shown in Table 1.

COMPARATIVE EXAMPLE 1

A commercially available ethylene polymer ("SX4551H" manufactured by Showa Denko K.K.) was evaluated. The λMAX, MT and Izod impact strength of this polymer were found to be low. This polymer was thus insufficient in both molding properties and mechanical properties. The results are shown in Table 1.

COMPARATIVE EXAMPLE 2

A commercially available ethylene polymer ("HZ8200B" manufactured by Mitsui Petrochemical Industries, Ltd.) was evaluated. The λMAX, MT and Izod impact strength of this polymer were found to be low. This polymer was thus insufficient in both molding properties and mechanical properties. The results are shown in Table 1.

COMPARATIVE EXAMPLE 3

A commercially available ethylene polymer ("BZ-81" manufactured by Mitsubishi Chemical Corp.) was evaluated. The λMAX, MT and Izod impact strength of this polymer were found to be low. This polymer was thus insufficient in both molding properties and mechanical properties. The results are shown in Table 1.

COMPARATIVE EXAMPLE 4

A commercially available ethylene polymer ("HF310" manufactured by Mitsubishi Chemical Corp.) was evaluated. The λMAX, MT and Izod impact strength of this polymer were found to be low. This polymer was thus insufficient in both molding properties and mechanical properties. The results are shown in Table 1.

COMPARATIVE EXAMPLE 5

(1) Synthesis of Solid Catalyst Component

In a 50-liter autoclave thoroughly replaced with purified nitrogen, 248 g of Mg(OC$_2$H$_5$)$_2$, 368 g of Ti(OB$_u$)$_4$,1,838 g of tetrabutoxy titanium tetramer and 12.8 liters of n-hexane were placed, and then the mixture was heated up to 150° C. while stirring the system. The system was kept at that temperature for 3 hours with stirring to carry out contact-treatment of the above compounds. To the resulting homogeneous viscous solution was added 7,560 ml of TiCl$_4$ as a halogenating agent at 38° C. over 240 minutes. The temperature of the system was then raised to 105° C., and the system was kept at that temperature for 5 hours for treatment. After the system was cooled to room temperature, the above-treated solid matter was sufficiently washed with n-hexane to obtain 1,310 g of a solid catalyst component (2) Prepolymerization In a 2-liter autoclave thoroughly replaced with purified nitrogen, 1 liter of n-hexane and 15 g of the above prepared solid catalyst component were placed. After the mixture was heated up to 80° C., hydrogen was introduced into the autoclave in such an amount as to make the pressure inside the autoclave at 2 kgf/cm$^2$, and then 45 mmol of diethyl aluminum monochloride was introduced together with ethylene to initiate prepolymerization. During the prepolymerization, ethylene was introduced gradually so that the partial pressure of ethylene was maintained within the range of 0–0.2 kgf/cm$^2$, and the feeding of ethylene was stopped 60 minutes after the initiation of the prepolymerization when the amount of polymerized ethylene reached 15 g. After the prepolymerization was completed, the autoclave was cooled to room temperature, and then replaced inside with purified nitrogen. Thereafter, the resulting prepolymerized catalyst was washed with n-hexane.

(3) Polymerization of Ethylene

In a 2-liter autoclave thoroughly replaced with purified nitrogen, 1 liter of n-hexane and 0.08 mmol of triethyl aluminum were placed. After the mixture was heated up to 90° C., hydrogen was introduced into the autoclave in such an amount as to make the pressure inside the autoclave at 12 kgf/cm$^2$, and then 30 mg of the above obtained prepolymerized catalyst was introduced together with ethylene to initiate polymerization. The polymerization was conducted at 90° C. for 2 hours while feeding ethylene into the autoclave so that the total pressure was maintained at 22 kgf/cm$^2$. The polymerization was terminated by injecting ethanol into the autoclave. The amount of the ethylene polymer obtained was 210 g. The λMAX, MT and Izod impact strength of this polymer were found to be low. This polymer was thus insufficient in both molding properties and mechanical properties. The results are shown in Table 1.

TABLE 1

| Example No. | Mw/10$^4$ | $\frac{Mw}{Mn}$ | MI g/10 min | ρ g/cm$^3$ | λMAX | MT g | Izod kgcm/cm | Molding Properties |
|---|---|---|---|---|---|---|---|---|
| Example 1 | 70.4 | 15.6 | 0.55 | 0.946 | 1.69 | 65.1 | n.b. | ○ |
| Example 2 | 47.6 | 23.9 | 4.79 | 0.954 | 1.90 | 33.5 | 93 | ○ |
| Comp. Example 1 | 22.5 | 11.2 | 4.84 | 0.947 | 1.41 | 23.3 | 28 | Δ |
| Comp. Example 2 | — | 23.4 | 5.82 | 0.952 | 1.52 | 15.8 | 38 | Δ |
| Comp. Example 3 | 23.8 | 11.1 | 4.12 | 0.949 | 1.49 | 26.5 | 46 | Δ |

TABLE 1-continued

| Example No. | Mw/10⁴ | $\frac{Mw}{Mn}$ | MI g/10 min | ρ g/cm³ | λMAX | MT g | Izod kgcm/cm | Molding Properties |
|---|---|---|---|---|---|---|---|---|
| Comp. Example 4 | — | — | 5.89 | 0.949 | 1.45 | 14.1 | 33 | x |
| Comp. Example 5 | 63.4 | 41.9 | 5.32 | 0.958 | 1.57 | 26.0 | 55 | Δ |

What is claimed is:

1. An ethylene polymer, which is an ethylene homopolymer or a copolymer of ethylene and an α-olefin having 3 to 20 carbon atoms, having the following properties:
   (1) the melt index (MI) at a temperature of 190° C. under a load of 21.6 kg is in the range of 0.1 to 100 g/10 min;
   (2) the density is in the range of 0.935 to 0.975 g/cm³; and
   (3) the characteristic value of biaxial extensional flow, λMAX (λMAX herein is an index of the extension ratio at which the nominal stress is maximum, provided that the extension ratio is in the range of 1 to 3, experimentally obtainable by a biaxial extensional flow test carried out at 190° C. at a constant strain rate $d\epsilon/dt$ of 0.05 s$^{-1}$), is at least 1.6.

2. The ethylene polymer according to claim 1, whose Izod impact strength at a temperature of −40° C. and MI can be shown by the following relational expression (1):

$$\log \text{Izod} > -0.39 \log \text{MI} + 2.02 \quad (1).$$

3. The ethylene polymer according to claim 1, whose melt tension (MT) at a temperature of 190° C. and MI can be shown by the following relational expression (2):

$$\log \text{MT} > -0.31 \log \text{MI} + 1.64 \quad (2).$$

* * * * *